(12) United States Patent
Gao et al.

(10) Patent No.: US 8,942,736 B2
(45) Date of Patent: Jan. 27, 2015

(54) METHOD AND SYSTEM FOR DETERMINING POSITION OF MOVING WIRELESS COMMUNICATION

(75) Inventors: Zhi Guo Gao, Beijing (CN); Li Li, Beijing (CN); Ping Pan, Beijing (CN); Yan Feng Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/499,617

(22) PCT Filed: Aug. 19, 2010

(86) PCT No.: PCT/JP2010/005113
§ 371 (c)(1),
(2), (4) Date: Mar. 30, 2012

(87) PCT Pub. No.: WO2011/039930
PCT Pub. Date: Apr. 7, 2011

(65) Prior Publication Data
US 2012/0190369 A1 Jul. 26, 2012

(30) Foreign Application Priority Data
Sep. 30, 2009 (CN) .......................... 2009 1 0174130

(51) Int. Cl.
*H04W 24/00* (2009.01)
*H04W 64/00* (2009.01)
(Continued)

(52) U.S. Cl.
CPC .............. *H04W 64/00* (2013.01); *G01S 19/48* (2013.01); *G01S 19/39* (2013.01); *H04W 60/04* (2013.01)

USPC ......... 455/456.5; 455/441; 455/519; 455/437

(58) Field of Classification Search
CPC ..... H04W 64/00; H04W 24/00; H04W 60/04; G01S 19/48; G01S 19/39; H04B 7/08
USPC ........ 455/456.1–457, 414.1–414.3, 517–519, 455/432.1–444
See application file for complete search history.

(56) References Cited

U.S. PATENT DOCUMENTS 6,311,065 B1 * 10/2001 Ushiki et al. .................. 455/440
6,647,268 B1 * 11/2003 Tsuchida et al. ........... 455/456.6
(Continued)

FOREIGN PATENT DOCUMENTS

| CN | 1821720 A | 8/2006 |
|---|---|---|
| JP | H09148981 | 6/1997 |

(Continued)

*Primary Examiner* — Sharad Rampuria
(74) *Attorney, Agent, or Firm* — Scully, Scott, Murphy & Presser, P.C.; Jennifer Davis, Esq.

(57) ABSTRACT

A method and system for determining the position of a moving wireless communication device, the method comprising: recording moving path of the wireless communication device in cells of a cellular wireless communication network; recording moving path and GPS information of a GPS wireless communication device moving in the cellular wireless communication network in cells of the cellular wireless communication network; determining the GPS wireless communication device whose moving path matches with the moving path of the wireless communication device; and determining the position of the wireless communication device based on the GPS information of the matching GPS wireless communication device.

16 Claims, 3 Drawing Sheets

(51) Int. Cl.
*G01S 19/48* (2010.01)
*G01S 19/39* (2010.01)
*H04W 60/04* (2009.01)

(56) References Cited

U.S. PATENT DOCUMENTS

| | | | |
|---|---|---|---|
| 7,117,087 B2 * | 10/2006 | Jung et al. | 701/446 |
| 7,692,583 B2 * | 4/2010 | Watanabe | 342/357.29 |
| 8,072,383 B1 * | 12/2011 | Martin et al. | 342/387 |
| 8,787,944 B2 * | 7/2014 | Smith | 455/456.6 |
| 2006/0009222 A1 * | 1/2006 | Kiviranta et al. | 455/436 |
| 2008/0114538 A1 * | 5/2008 | Lindroos | 701/208 |
| 2009/0312025 A1 * | 12/2009 | Hasegawa | 455/437 |
| 2012/0322460 A1 * | 12/2012 | Liu et al. | 455/456.1 |

FOREIGN PATENT DOCUMENTS

| | | | | |
|---|---|---|---|---|
| JP | 2002281538 A | | 9/2002 | |
| JP | 2003227867 A | | 8/2003 | |
| JP | 2004228781 | * | 8/2004 | |
| JP | 2004228781 A | | 8/2004 | |
| JP | 2005223436 | * | 8/2005 | H04Q 7/34 |
| JP | 2005223436 A | | 8/2005 | |
| JP | 2006352626 A | | 12/2006 | |
| JP | 2007081860 A | | 3/2007 | |
| JP | 2009017217 A | | 1/2009 | |
| JP | 2009033730 A | | 2/2009 | |
| JP | 2009145167 A | | 7/2009 | |
| WO | WO2009034809 A1 | | 3/2009 | |

\* cited by examiner

| cell handover information | | | |
|---|---|---|---|
| number | time | cell identification | signal strength |
| 1 | 192428 | 25357 | -77 |
| 2 | 192603 | 32853 | -79 |
| 3 | 193041 | 8249 | -69 |
| 4 | 193115 | 32853 | -91 |
| 5 | 193152 | 8249 | -87 |
| 6 | 193204 | 25302 | -75 |
| 7 | 193228 | 4626 | -75 |
| 8 | 193238 | 8249 | -87 |
| 9 | 193302 | 8393 | -79 |
| 10 | 193326 | 8249 | -83 |
| 11 | 193503 | 32851 | -95 |
| 12 | 193541 | 34082 | -69 |
| 13 | 193947 | 34081 | -69 |
| 14 | 194010 | 34082 | -81 |
| 15 | 194219 | 3612 | -81 |

METHOD AND SYSTEM FOR DETERMINING POSITION OF MOVING WIRELESS COMMUNICATION

CROSS-REFERENCE TO RELATED APPLICATIONS

The present invention relates to and claims the benefit of the filing date of commonly-owned, co-pending PCT Patent Application No. PCT/JP2010/005113, filed Aug. 19, 2010, which further claims the benefit of priority date of commonly-owned, co-pending European Patent Application No. CN 200910174130.6, filed on Sep. 30, 2009, the entire contents and disclosure of which is incorporated by reference as if fully set forth herein.

TECHNICAL FIELD

The invention generally relates to a wireless communication system, and particularly to the positioning of a moving wireless communication device in the wireless communication system.

BACKGROUND ART

In a wireless communication system, some wireless communication devices or mobile terminals are equipped with GPS function (typically, such as GPS equipped handsets), and some mobile terminals aren't equipped with GPS function. In practice, there is sometimes a need to determine the geographical position of a wireless device that isn't equipped with GPS function. There exists technologies for determining the geographical position of the mobile terminal that isn't equipped with GPS function in the prior art, in which a technology for positioning the non-GPS wireless communication device is radio positioning technology (radiolocation). The radio positioning technology employs two approaches, one of which is Angle Of Arrival (AOA) and the other is Time Difference Of Arrival (TDOA). In AOA, received signal strength and signal propagation time measurement on at least two wireless communication system base station communication towers is performed to evaluate an angle between each communication tower and the wireless communication device, such that a point of intersection of connecting line between each communication tower and the wireless communication device is measured as the position of the wireless communication device; in TDOA, the difference in time when a signal of the wireless communication device arrives at each communications tower is measured to determine the distance between the wireless communication device and the communication tower, such that the position of the wireless communication device is determined AOA and TDOA need a line-of-sight pathway between the wireless communication device and the base station communication tower.

SUMMARY OF INVENTION

Technical Problem

However, in some cases, e.g. in roads of a city with skyscrapers, the line-of-sight pathway between the wireless communication device and the communication tower is often blocked by barriers.

Solution to Problem

To this end, the invention provides a method and system for determining the position of a moving wireless communication device.

In an aspect, the invention provides a method for determining the position of a wireless communication device moving in a cellular wireless communication network, comprising: recording moving path of the wireless communication device in cells of the cellular wireless communication network; recording moving path and GPS information of a GPS wireless communication device moving in the cellular wireless communication network in cells of the cellular wireless communication network; determining the GPS wireless communication device whose moving path matches with the moving path of the wireless communication device; and determining the position of the wireless communication device based on the GPS information of the matched GPS wireless communication device.

In another aspect, the invention provides a system for determining the position of a wireless communication device moving in a cellular wireless communication network, comprising: recording means for recording moving paths of the wireless communication device and a GPS wireless communication device in cells of the cellular wireless communication network; GPS information recorder for recording GPS information of the GPS wireless communication device; comparator for determining the GPS wireless communication device whose moving path matches with the moving path of the wireless communication device; and position calculator for determining the position of the wireless communication device based on the GPS information of the matched GPS wireless communication device.

In further aspect, the invention provides a wireless communication device of a cellular wireless communication network, comprising: cell information recorder, when the wireless communication device is moving in the cellular wireless communication network, the cell information recorder recording cell handover information based on cell identification signaling broadcasted by a base station of the cellular wireless communication network, wherein the cell handover information contains the cell where the wireless communication device enters and entering time.

Advantageous Effects of Invention

The invention can enable higher-precision positioning for a non-GPS wireless communication device through incorporating mobile cellular information of a wireless communication device and high-precision GPS positioning. From the more detailed description of exemplary embodiments of the invention in the attached drawings, the above and other objects, features and advantages of the invention will become more apparent. The same or similar signs in the attached drawings generally represent the same or similar components or parts in the exemplary embodiments of the invention.

DESCRIPTION OF EMBODIMENTS

A way implementing the invention is described in more detail in the following with reference to the drawings in which an embodiment of the invention is shown. However, the present invention may be realized in various forms and should not be interpreted to be limited to the implementing way described. Without hindering those skilled in the art from understanding and performing the present invention, components or details not directly related with contents of the present invention are omitted in the embodiment and drawings, so as to highlight the contents of the invention for those skilled in the art to understand the essence of the invention more clearly.

Figure 1:
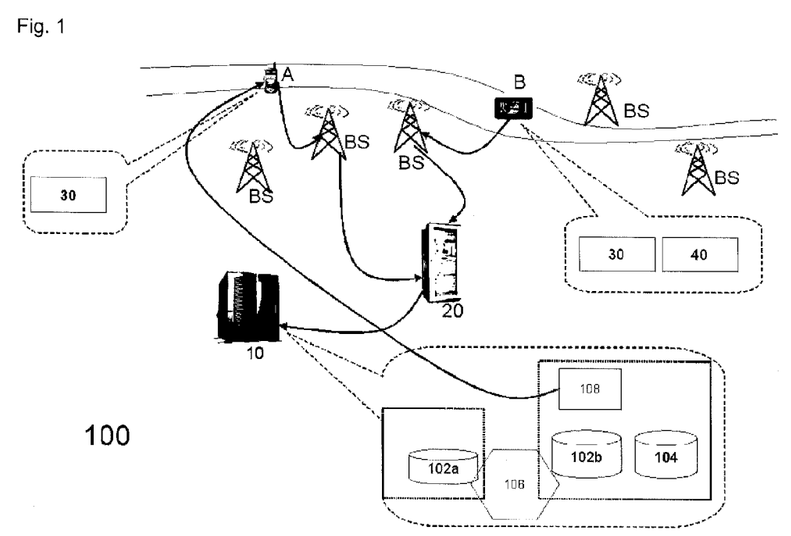
FIG. 1 schematically represents a block diagram of a wireless communication network in accordance with an embodiment of the invention.

First of all, refer to FIG. 1. FIG. 1 schematically represents a block diagram of a communication network system 100 in accordance with an embodiment of the present invention. As shown, the communication network system 100 includes a non-GPS wireless communication device A, a wireless communication device having GPS function B and a positioning service system 10, which communicate through a cellular wireless communication network (not shown). The cellular wireless communication network (such as GSM) contains a mobile switching center 20 and a plurality of wireless communication base stations BSs.

An example of the non-GPS wireless communication device A is an ordinary handset which has conventional functions, like receiving and sending signals through the base station BS, storing and processing the signals, inputting and outputting information, etc., but without GPS function. When the ordinary handset A changes its geographical position due to movement, the ordinary handset A receives and sends signals to the corresponding base station BS, and also handovers from a base station BS to another base station BS on the moving path.

A signal coverage range of the base station BS of the cellular wireless communication network is a geographic area of a certain range, which may further be divided into several cells. The base station BS periodically broadcasts cell identification signaling in each cell to which it belongs. The ordinary handset A may collect cell identification signaling sent from neighboring cells to generate a measurement report used for a purpose like communication link establishment. The ordinary handset A can detect signal strength of the received signaling when it receives cell identification signaling, and usually takes a cell with maximum received signal strength as current cell.

An example of a wireless communication device having GPS function B is a handset having GPS (Global Positioning System) function, abbreviated to GPS handset. In addition to general functions of an ordinary handset, the GPS handset B has a GPS module, and may receive and process GPS information to further determine the position of the GPS handset B.

The basic idea of the invention is to use the wireless communication device having GPS function (such as the GPS handset) to determine the position for the non-GPS wireless communication device (such as the ordinary handset). The non-GPS wireless communication device is also referred to as "wireless communication device" hereinafter, and the wireless communication device having GPS function is referred to as "GPS wireless communication device". In a context without the need for distinguishing whether the wireless communication device has GPS function, "wireless communication device" is also used for representing the ordinary wireless communication device and "GPS wireless communication device", to specify their commonalties. In the description of the embodiment, the "ordinary handset" is also used as an example of the "wireless communication device", and the "GPS handset" is used as an example of the "GPS wireless communication device". Similarly, in a context without the need for distinguishing whether the handset has GPS function, the "handset" is also used for representing the ordinary handset and the GPS handset, to specify their commonalties. It is needed to specify that the ordinary handset and the GPS handset are used by way of example, only for convenience of description and briefness of explanation, and apparently, they do not constitute limitations to various implementing ways of the "wireless communication device" and "GPS wireless communication device" of the invention.

In accordance with the embodiment of the invention, in addition to conventional functional means, the ordinary handset A further includes a cell information recorder 30 for recording cell handover information. As already noted hereinabove, the base station BS periodically broadcasts cell identification signals in each cell, and the ordinary handset A may collect cell identification signals sent by the base station BS in each cell, and can detect the strength of the received signal. In accordance with the embodiment of the present invention, the cell information recorder 30 records cell identification of a base station cell with strongest signal strength and the moment entering into the cell, as the cell handover information. The recorded cell handover information may be stored in a memory (not shown) of the ordinary handset A. The ordinary handset A also periodically sends the cell handover information to the positioning service system 10 through a transceiver (not shown). About the cell handover information, a further description will be given in the following in connection with FIGS. 2A-2B.

In accordance with the embodiment of the present invention, the GPS handset B also contains a cell information recorder 30, which has the same functions and works in the same way as those of the cell information recorder 30 of the ordinary handset A. Furthermore, the GPS handset B further contains a GPS information recorder 40 for recording GPS information from a GPS satellite signal. Those skilled in the art know that, depending on specific implementations, the GPS information may directly contain a geographical position at which the GPS handset B is located, or may be used for calculating a geographical position of the GPS handset B. The GPS handset B stores the recorded cell handover information and GPS information in a memory. In a specific implementation, the GPS handset B periodically sends the cell handover information to the positioning service system 10 through its own transceiver (not shown), and also periodically sends the GPS information to the positioning service system 10 through the transceiver.

The positioning service system 10 in accordance with the embodiment of the present invention contains recording means 102a, 102b, a GPS information recorder 104, a comparator 106 and a position calculator 108.

The recording means 102a, 102b of the positioning service system 10 are used for recording moving paths of the ordinary handset A and the GPS handset B in cells of the cellular wireless communication network, such as the cell handover information from the ordinary handset A and GPS handset B.

The GPS information recorder 104 is used for recording the GPS information of the GPS wireless communication device (such as the GPS handset B).

In accordance with the embodiment of the present invention, a database system may be used for implementing the recording means and the GPS information recorder, for example as shown in FIG. 1, a database 102a, 102b is used for recording the cell handover information and another database 104 is used for recording the GPS information.

It needs to be noted that FIG. 1 shows two databases 102a and 102b for recording the cell handover information from the ordinary handset A and the cell handover information from the GPS handset B respectively, and this is only for highlighting or emphasizing that the cell handover information is from the ordinary handset A and the GPS handset B respectively. However, this is not necessary in specific implementations. Those skilled in the art know that, as long as the data structure of the database is designed to be able to distinguish between information representing different handsets, the cell handover information of the ordinary handset A and the cell handover information of the GPS handset B may be placed in the same database. The comparator 106 is used for determining the GPS wireless communication device (such as the GPS handsets B) whose moving path matches with the moving path of the wireless communication device (such as the ordinary handset A).

The position calculator 108 is used for determining the position of the wireless communication device A according to the GPS information of the matched GPS wireless communication device B determined by the comparator 106.

In accordance with an embodiment of the invention, the way by which the comparator 106 determines the GPS handset B whose moving path matches with the moving path of the ordinary handset A is to find the GPS handset B which passes through the same cells, whose residence time in the same cell is close and whose moment of leaving the last same cell is close in comparison with the ordinary handset A.

In accordance with the embodiment of the invention, the moving path of the wireless communication device in cells of the cellular wireless communication network may be characterized by the cell handover information obtained by the wireless communication device according to the cell identification signal broadcasted by the mobile base station. So may be the moving path of the GPS wireless communication device in cells of the cellular wireless communication network. Then, by determining the GPS handset B whose cell handover information matches with the cell handover information of the ordinary handset A, the comparator 106 determines the GPS handset B which passes through the same cells, whose residence time in the same cell is close and whose moment of leaving the last same cell is close in comparison with the ordinary handset A.

The position calculator 108 may then calculate the position of the ordinary handset A according to the cell handover information of the ordinary handset A, the cell handover information of the matching GPS wireless communication device B and the GPS handset B.

Figure 2A:
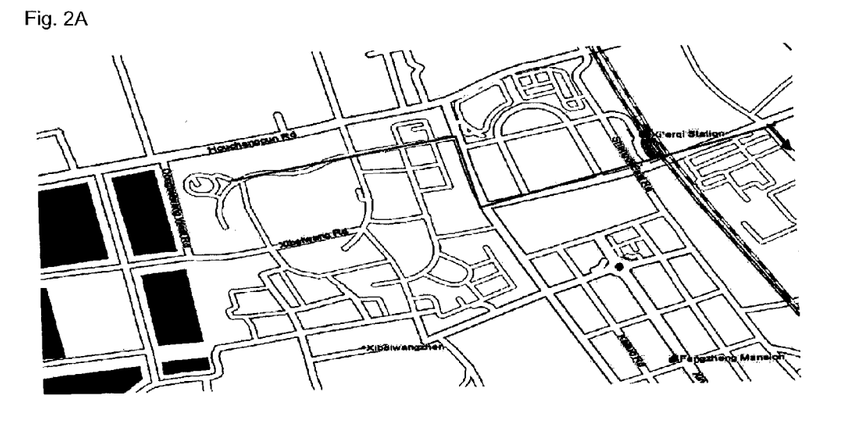
FIG. 2A schematically represent moving path of a wireless communication device and the method for representation thereof.
Figure 2B:
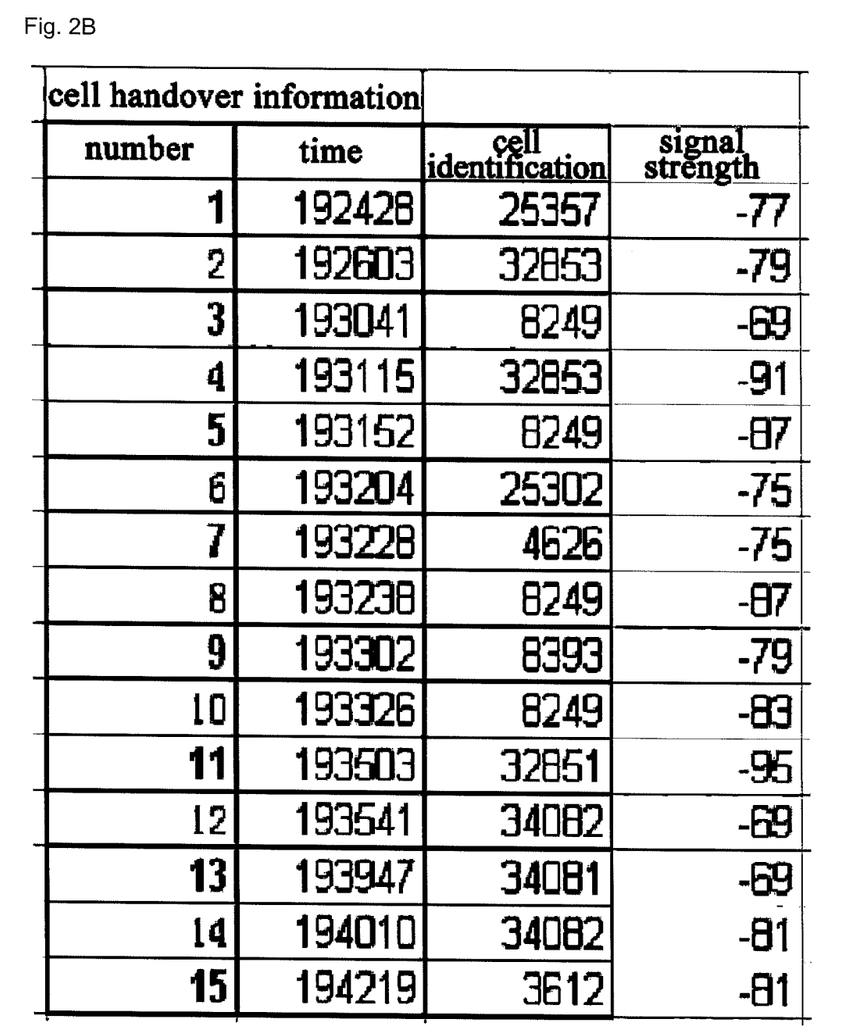
FIG. 2B schematically represent moving path of a wireless communication device and the method for representation thereof.

To better illustrate a more detailed implementing way of the comparator 104 and the position calculator of the present invention, the cell handover information is now further introduced in connection with FIGS. 2A-2B.

FIGS. 2A-2B exemplarily represent a form of cell handover information recorded by the cell information recorder 30 in accordance with the embodiment of the present invention as a whole. FIG. 2A exemplarily represents a line through which a user of the ordinary handset A (or the GPS handset B) travels. FIG. 2B represents the contents of the cell handover information recorded sequentially by the user's handset while passing through the line shown in FIG. 2A in accordance with the embodiment of the present invention. As shown, each row under "time" in the head of table in FIG. 2B represents a time value; each row under "cell identification" in the head represents cell identification number of a base station cell with strongest signal strength where the handset enters at some moment. For example, a data pair (192428, 25357) in row 1 in the table represents that the handset enters into a cell with cell identification number of "25357" at the moment of 19:24:28, and a data pair (192603, 32853) in row 2 represents that the handset enters into a cell with identification number of "32853" at the moment of 19:26:03.

By a simple process of the contents in the table in FIG. 2B, it is easy to derive a data pair $(C_i, t_i)$ of residence time of the handset in some cell. For convenience, identification number "25357" is replaced with simplified identification "1", and identification number "32853" is replaced with identification "2", then residence time t1 of the handset in cell "1" is the difference between the moment when the handset enters into cell "1" and the moment when the handset enters into a next cell "2", i.e. t1=19:26:03-19:24:28. We can use a data pair $(C_i, t_i)$ to represent the residence time of the handset in some cell, wherein $C_i$ identifies the cell, and ti identifies the residence time of the handset in the cell $C_i$. In this example, the data pair $(C_1, t_1)$ represents that the residence time of the handset in cell "1" is $t_1$=19:26:03-19:24:28.

From the table in FIG. 2B, the time when the handset leaves some cell may be derived. The time when the handset leaves a cell is the time when the handset enters into a next cell from this cell. For example, from the table in FIG. 2B, it may be determined that the time when the handset leaves cell "1" is 19:26:03, that is, the time when the handset enters into cell "2".

In a similar manner, residence time $(C_i, t_i)$ of the handset in each base station $C_i$ may be calculated. Therefore, a data pair sequence $(C_1, t_1), (C_2, t_2), \ldots (C_K, t_K)$ may be derived from the table in FIG. 2B, and the sequence represents that the residence time of the handset in cell $C_1$ is $t_1$, the residence time in cell $C_2$ is $t_2$ ... the residence time in cell $C_K$ is $t_K$.

Generally speaking, the moving path may be represented using the data pair sequence and the time when the handset leaves the last cell, that is, $$S=\{T,(C_1,t_1),(C_2,t_2),\ldots(C_K,t_K)\}: \quad (1)$$

The formula (1) is called as cell handover sequence with a length of K, wherein $C_i$ represents cell (i=1 ... K), $t_i$ represents the residence time of the handset in cell $C_i$, T is the moment when the handset leaves the last cell $C_K$, that is, the moment when the handset enters a next cell $C_{K+1}$ following the cell $C_K$.

The cell handover sequence S represents that the residence time of the ordinary handset A in cell $C_1$ is $t_1$, and then it enters into a next cell $C_2$ with residence time in cell $C_2$ being $t_2$ ... , residence time in cell $C_K$ time being $t_K$, and leaves the cell $C_K$ at the time T.

From the above, the moving path of the handset (the ordinary handset A and the GPS handset B) moving in the cellular network may be characterized by the cell handover information recorded by the handset according to the cell identification signaling broadcasted by the base station cell, including the time when the handset enters each cell; may also be characterized by a sequence formed by data pair $(C_i, t_i)$ of the residence time of the handset in each cell $C_i$ sequentially; and may further be characterized by the cell handover sequence shown by the formula (1).

Apparently, the cell handover information or cell handover sequence of the handset characterizes not only cells $(C_1, C_2 \ldots C_K)$ where the handset passes through, but also characterizes moving speed of the handset—generally speaking, the shorter the time $t_i$ is, the faster the moving speed of the handset in cell $C_i$ will be; the smaller the average of $t_1$ to $t_K$ is, the faster the average speed in cell $C_1, C_2 \ldots C_K$ will be.

Figure 3:
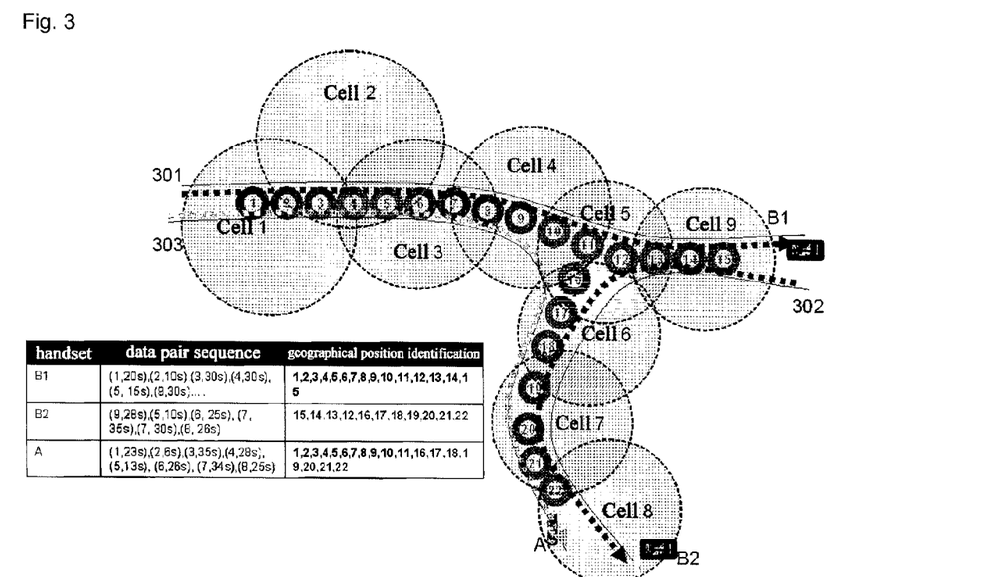
FIG. 3 schematically represents moving paths of different wireless communication devices.

Now refer to FIG. 3 below. FIG. 3 schematically represents moving paths of different wireless communication devices in the cellular network. Moving paths of the ordinary handset A and GPS handsets B1 and B2 when moving in the cellular wireless communication network in a certain period of time are represented in the top right corner of FIG. 3, wherein dashed arrows 301, 302, 303 represent moving paths of the GPS handset B1, the GPS handset B2, and the ordinary handset A respectively. Dashed circles in the figure represent base station cells, wherein eight cells are shown in the figure: cell 1, cell 2 . . . cell 8. As shown in the figure, the cells where the moving path of the GPS handset B1 passes through are cells 1, 2, 3, 4, 5, 9; the cells where the moving path 301 of the GPS handset B2 passes through are cells 9, 5, 6, 7, 8; and the cells where the moving path 303 of the ordinary handset A passes through are cells 1, 2, 3, 4, 5, 6, 7, 8.

The above moving paths are obtained from the cell handover information recorded by the cell information recorders 30 of the GPS handsets B1 and B2 as well as of the ordinary handset A, as mentioned above. The residence time thereof in each cell may also be obtained from the cell handover information, as shown in the table in the bottom left corner of FIG. 3, three data pair sequences in column 2 in the table represent corresponding residence time of the GPS handsets B1 and B2 and the ordinary handset A in each cell respectively. For example, data pair (1, 20 s) in row 2 represents that the GPS handset B1 resides in cell 1 for 20 seconds; data pair (1, 23 s) in row 3 represents that the ordinary handset A resides in cell 1 for 23 seconds . . . .

It needs to be noted that in order to facilitate description, data as in the table in the bottom left corner of FIG. 3 are processed data, for example, real cell identifiers as shown in FIG. 2B are replaced with schematic numbers of "1", "2" . . . "8". In addition, the unit of the residence time may be considered to be second by default, and thereby the data pair (1, 23 s) may be represented as (1, 23).

Numbers 1-22 with circle in FIG. 3 represent identifications of geographical positions on the moving paths of the GPS handsets B1, B2 and the ordinary handset A. Specifically, column 3 row 1 in the table in the bottom left corner of FIG. 3 represents that the GPS handset B1 passes through geographical positions 1, 2, 3, 4, 5, 6, 7, 8, 9, 10, 11, 12, 13, 14, 15 sequentially. Column 3 row 2 represents that the GPS handset B2 passes through geographical positions 15, 14, 13, 12, 16, 17, 18, 19, 20, 21, 22 sequentially. The above geographical positions may be obtained according to the GPS information of the GPS handsets B1, B2.

Column 3 row 3 in the bottom left corner of FIG. 3 represents that the ordinary handset A passes through geographical positions 1, 2, 3, 4, 5, 6, 7, 8, 9, 10, 11, 16, 17, 18, 19, 20, 21, 22 sequentially, wherein some geographical positions may be calculated in accordance with the method of the present invention. The specific way how to perform calculation is further described in the following in connection with FIG. 4.

Figure 4:
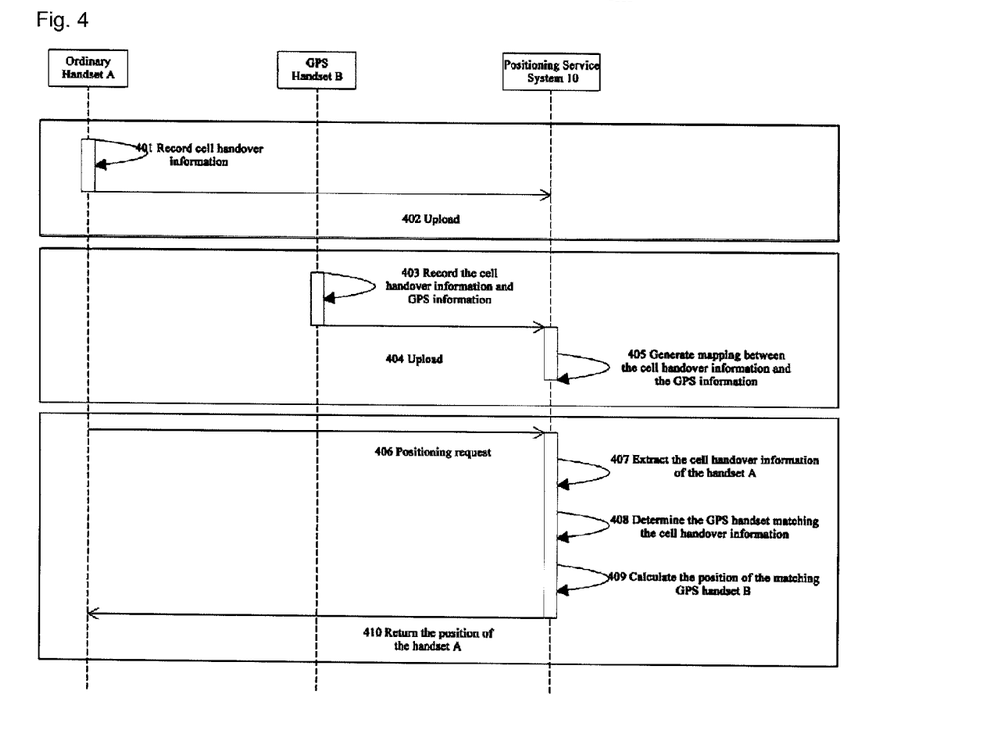
FIG. 4 schematically represents a flow chart of a method in accordance with the embodiment of the invention.

Refer to FIG. 4 below. FIG. 4 is a flow chart representing the method for determining the position of the wireless communication device in the wireless communication network in accordance with the embodiment of the invention.

FIG. 4 shows ten steps 401-410, executed by the wireless communication device A, the GPS wireless communication device B and the positioning service system 10 respectively. In FIG. 4, the ordinary handset A and the GPS handset B are still used for representing the wireless communication device A and the GPS wireless communication device B respectively. It needs to be noted that FIG. 4 illustrates the ten steps intended to explain various embodiments of the present invention completely as much as possible, however, any specific embodiment has no need to include all of the steps, and marks for the steps do not mean the execution order of the steps.

As shown, operations of the ordinary handset A involve steps 401 and 402. Specifically, in step 401, the cell information recorder 30 of the ordinary handset A records the cell handover information. The way by which the cell information recorder 30 of the ordinary handset A records the cell handover information according to broadcasts of the base station cell has been described previously in connection with FIG. 1, and it will be omitted for briefly.

In step 402, the ordinary handset A periodically uploads the cell handover information to the positioning service system 10 through its transceiver.

Optionally, in step 406, the ordinary handset A sends a positioning request to the positioning service system 10 to request the positioning service system 10 to determine the position of the ordinary handset A. Accordingly, in step 410, the ordinary handset A receives position information returned by the positioning service system 10 in response to the request.

It needs to be noted that, although the flow chart shows that the ordinary handset A sends the positioning request for the ordinary handset A and receives the position information returned by the positioning service system 10, such request may also be sent by other devices which may communicate with the positioning service system 10. In accordance with another embodiment of the invention, such request may be sent by a wireless communication device of another user authorized by the user of the ordinary handset A, and accordingly, the position information calculated by the positioning service system 10 will be returned to the wireless communication device of the user who sent the request.

As shown, the GPS handset B executes steps 403 and 404. Specifically, in step 403, the cell information recorder 30 of the GPS handset B records the cell handover information in the same way as the cell information recorder 30 of the ordinary handset A records the cell handover information. In addition, the GPS information recorder 40 of the GPS handset B also records the GPS information from GPS satellite signals. Those skilled in the art know that the GPS position information may be obtained from the GPS information, and that the GPS position information may be calculated by the GPS module equipped in the GPS handsets B, and may also be calculated by a server with more powerful computing function. As there are already a variety of implementations in the prior art, this is not a problem to be solved in the invention, thereby it will be omitted for briefly.

In step 404, the GPS handset B periodically uploads the cell handover information and the GPS information to the positioning service system 10 through its transceiver.

It needs to be noted that, although the flow chart uses one step 403 to represent that the GPS handset B records the cell handover information and the GPS information, it does not mean that the cell handover information and the GPS information are necessarily recorded at the same time; similarly, the uploading of the cell handover information and the GPS information does not need to be completely synchronous operation.

Operations of the positioning service system 10 involve part or all of steps 402, 404, 405, 406, 407, 408, 409 and 410.

First, the recording means 102a of the positioning service system 10 records moving path (402) of the wireless communication device A in cells of the cellular wireless communication network. This is a step corresponding to the step in which the handset A uploads the cell handover information.

The recording means 102b and 104 of the positioning service system 10 also record the moving path of the GPS wireless communication device B moving in the cellular wireless communication network in cells of the cellular wireless communication network and the GPS information (404) respectively. This is a step corresponding to the step in which the GPS handset B uploads the cell handover information and the GPS information.

Optionally, the positioning service system 10 generates a mapping (405) between the cell handover information from the GPS wireless communication device B and the GPS information.

The above steps may be carried out when computing resources are idle, and thus, the processing time required when associating the cell handover information with the GPS information later may be saved. However, it needs to be pointed out that the positioning service system 10 may also extract the associated GPS information from the GPS information recorder 104 after finding the matching GPS wireless communication device B.

Optionally, the positioning service system 10 receives the positioning request (406) for the ordinary handset A from the ordinary handset A. This is a step corresponding to the step in which the ordinary handset A sends the positioning request. As noted above, the positioning request for the ordinary handset A may be also originated from a wireless communication device of another user authorized by the user of the ordinary handset A. In fact, technically speaking, even if the positioning service system 10 does not receive any request from outside, it may also position the ordinary handset A independently.

When it is needed to locate the ordinary handset A, the positioning service system 10 extracts the latest cell handover information (407) of the ordinary handset A from the recording means 102a. As noted above, the cell handover information contains the cell where the ordinary handset A enters and the entering time, and reflects moving path and speed of the ordinary handset A.

In order to determine the position of the ordinary handset A, the comparator 106 of the positioning service system 10 first determines the GPS handset (408) whose moving path matches with the moving path of the ordinary handset A.

In accordance with an embodiment of the invention, the comparator 106 finds the GPS handset which passes through the same cells, whose residence time in the same cell is close and whose moment of leaving the last same cell is close in comparison with the ordinary handset A according to the cell handover information of the ordinary handset A extracted from the recording means 102a and the cell handover information of the GPS handset recorded in the recording means 102b.

In accordance with an embodiment of the invention, the positioning service system 10 derives a cell handover sequence from the cell handover information of the ordinary handset A and the GPS handset, and derives a cell handover sequence from the cell handover information of the GPS handset, where the cell handover sequence contains residence time of corresponding handset in cells and the moment leaving the last cell. The comparator 106 determines the GPS handset whose cell handover sequence matches with cell handover sequence of the ordinary handset A.

In accordance with an embodiment of the invention, the comparator 106 finds the GPS handset whose cell handover sequence $S_2=\{T_2,(C_1, t_1'), (C_2, t_2'), \ldots (C_K, t_K')\}$, in comparison to the cell handover sequence $S_1=\{T_1, (C_1, t_1), (C_2, t_2), \ldots (C_K, t_K)\}$ of the ordinary handset A, satisfies the following matching condition of:

$$|T_1-T_2|<\text{Delta } T \text{ and } |t_i-t_i'|<\text{Delta } t, i=1, 2, \ldots, K$$

Where $t_i$ and $t_i'$ are residence times of the ordinary handset A and the GPS handset in cell $C_i$ respectively, $T_1$ and $T_2$ are moments when the ordinary handset A and the GPS handset leave the last cell $C_K$ respectively, and Delta T and Delta t are predetermined thresholds respectively.

The GPS handset satisfying the above condition and matching the ordinary handset A may be used by the position calculator of the positioning service system 10 to determine the position of the ordinary handset A.

Now in connection with FIG. 3, the process for finding the matching GPS handset for the ordinary handset A as shown in FIG. 3 is described. Set K=1, threshold Delta T=5, and Delta t=5, and at some moment when the ordinary handset A just entered into cell 2 from cell 1, it is needed to locate the ordinary handset A, the comparator 106, according to the data pair sequence of the ordinary handset A in the bottom left corner of FIG. 3 and the cell handover sequence $S_1=\{T_1, (1, 23)\}$ of the ordinary handset A, finds the cell handover sequence $S_2=\{T_2, (1, 20)\}$ of the GPS handset satisfying the matching condition (Assuming that actual values of T1 and T2 satisfy $|T_1-T_2|<5$, and the corresponding GPS handset is the GPS handset B1 moving along the line 301).

The above matching condition involves three important parameters: K, Delta T and Delta t. The greater K is, the higher the requirement for similarity degree of the ordinary handset A and the GPS handset B as the matching target on the moving path will be; the smaller Delta T and Delta t are, the higher the similarity degree of the ordinary handset A and the target GPS handset B on moving speed will be, and the higher the precision of position of the ordinary handset A obtained from the matching GPS handset B thereafter will be, but at this time the lower the matching success rate will be, and the larger the computing cost will be; on the contrary, the smaller K is, the greater Delta T and Delta t are, then the lower the similarity degree of moving path and moving speed of the matched ordinary handset A and GPS handset B will be, but at this time the probability of matching success becomes larger. Based on the above understanding, those skilled in the art may set appropriate parameters based on specific circumstances, for example according to capacity of computing resources, features of local roads, requirements for positioning precision, etc.

After the comparator 106 determines the matching GPS handset, the position calculator 108 of the positioning service system calculates the current position (409) of the ordinary handset A based on the GPS information of the GPS handset.

In accordance with an embodiment of the invention, as mentioned above, in the case that the comparator 106 determines the matching GPS handset by finding the cell handover sequence S2 of the GPS handset that matches with the cell handover sequence S1 of the ordinary handset A, in order to obtain the position of the ordinary handset A at the current moment t, the position calculator 108 calculates the value of $T_2+t-T_1$, obtains the position of the GPS handset at the moment $T_2+t-T_1$ from the GPS information of the matching GPS handset, and presumes this position as the current position of the ordinary handset A.

It should be understood that, when the latest cell handover sequence S1 of the ordinary handset A matches with the cell handover sequence S2 of the GPS handset B successfully, and when the current cell where the ordinary handset A locates and the cell where the GPS handset B will locate next are the same cell $C_{K+1}$, $t-T_1$ is the time difference between the current moment t and the moment $T_1$ when the ordinary handset A leaves cell $C_K$ (i.e. enters into cell $C_{K+1}$), therefore, the position of the GPS handset at $T_2+t-T_1$ is the GPS position at which the GPS handset will arrive with the lapse of time $t-T_1$ after leaving cell CK. As the speed of the ordinary handset A is similar with that of the GPS handset, and the moments when they enter the current cell $C_{K+1}$ are close, the GPS position of the GPS handset at $T_2+t-T_1$ may be presumed as the current position of the ordinary handset A.

To continue with the process of finding the matching GPS handset for the ordinary handset A illustrated in connection with FIG. 3, when it is required to position the ordinary handset A at some moment when the ordinary handset A just entered into cell 2 from cell 1, the position of the ordinary handset A at the current moment t is the GPS position of the GPS handset B1 at the moment $T_2+t-T_1$, and the position, depending on specific GPS information, may be the position 4 (circled) shown in FIG. 3 and also be position 5 (circled). In accordance with the method of the invention, in the situation shown in FIG. 3, most of real positions corresponding to the ordinary handset A in the table in the bottom left corner of FIG. 3 can be derived from the GPS position of the GPS handset B1 or the GPS handset B2.

In accordance with an embodiment of the invention, in a case that a higher precision is needed, the position calculator 108 may calculate the difference in speeds of the ordinary handset A and the GPS handset B when moving, according to the cell handover sequence of the ordinary handset A and the cell handover sequence of the matching GPS handset B, and make appropriate amendment to the current position of the ordinary handset A derived from the GPS position of the GPS handset based on the difference in speeds. It is obvious to those skilled in the art that the above difference in speeds is mainly embodied as difference in residence times of the ordinary handset A and the GPS handset B in the same cell. The amendment to the position derived from the GPS position of the GPS handset shall be performed mainly according to the difference in speeds in the last cell in the cell handover sequence.

Finally, the positioning service system 10 returns the current position of the ordinary handset A determined by the position calculator 108 according to the GPS information of the matching GPS handset to the requesting party who requested to locate the ordinary handset A.

The invention can obtain higher-precision positioning for the non-GPS wireless communication device by incorporating mobile cellular information of the wireless communication device and high-precision GPS positioning. The invention performs positioning by moving path and speed of the wireless communication device when moving, reflected by the cell handover information, while the obtaining of the cell handover information is not affected by the fact that the visual pathway between the wireless communication device and some base station communication tower is blocked. Although the method of the present invention possibly has positioning error in determining cell handover point, the range of the error can be bounded. The radius of an overlapping coverage area of two adjacent base station cells is usually about 50 M, even in the worst case where the wireless communication device concurrently makes errors in determining both cells before and after the movement passes, and thus the largest judgment error is merely 50*2=100 M, which is much smaller than the error of 300 M in existing technologies such as the mobile positioning method (cell positioning).

Although the present invention and exemplary embodiments thereof are described above with reference to the attached drawings, it should be understood that the invention is not strictly limited to these embodiments, and those of ordinary skill in the art can make various changes and modifications to the embodiments, without departing from the scope and purpose of the present invention. For example, although in the description, the functional components, the comparator 106 and the position calculator 108, are deployed in the positioning service system 10, these functional components may also be deployed on the wireless communication device; and the functional components of the positioning service system 10 may also be deployed on other server in the communication network, or integrated separately into a dedicated server. All of these changes and modifications are intended to be contained in the scope of the present invention defined by the attached claims.

From the above description, those skilled in the art know that the present invention may be embodied as means, methods or computer program products. Therefore, the present invention may be implemented specifically as the following forms, i.e. may be entirely hardware, entirely software (including firmware, resident software, microcode, etc.), or a combination of software part generally called as "circuit", "module" or "system" and hardware part. In addition, the present invention may take the form of computer program products embodied in any tangible expression medium in which computer-usable program codes are contained.

Any combination of one or more computer-usable or computer-readable media may be used. The computer-usable or computer-readable medium may be—but not limited to—for example electrical, magnetic, optical, electromagnetic, infrared, or semiconductor system, means, device or transmission medium. More specific examples of the computer-readable medium (non-exhaustive list) include the following: electrical connection of one or more wires, portable computer disk, hard disk, random access memory (RAM), read-only memory (ROM), erasable programmable read-only memory (EPROM or Flash memory), optical fiber, portable compact disk read-only memory (CD-ROM), optical memory device, transmission medium such as supporting Internet or Internet, or magnetic memory device. Note that the computer-usable or computer-readable medium could even be paper printed with programs on or other suitable medium, this is because, for example, by electronic scanning of such paper or other medium, the programs are obtained electronically, then compiled, interpreted or processed in an appropriate way, and if necessary stored in the computer memory. In the context of this document, the computer-usable or computer-readable medium may be any medium which contains, stores, conveys, propagates, or transmits programs for an instruction execution system, means or device to use, or associated with the instruction execution system, means or device. The computer-usable medium may include data signals, which may be propagated in the base band or as part of carrier and by which the computer-usable program codes are embodied. The computer-usable program codes may be transmitted using any appropriate medium, including—but not limited to—radio, wire, optical cable, RF and so on.

Computer program codes for performing operations of the present invention may be written in any combination of one or more programming languages, including object-oriented programming languages—such as Java, Smalltalk, C++ and the like, as well as conventional procedural programming languages—such as "C" programming language or close programming language. Program codes may be executed completely on the computer of the user, executed in part on the computer of the user, executed as an independent software package, executed in part on the user's computer and in part on a remote computer, or executed entirely on a remote computer or server. In the latter case, the remote computer may be connected to the user's computer through any kind of network—including local area network (LAN) or wide area network (WAN), or may be connected to an external computer (through Internet for example using Internet service provider).

In addition, each block of the flow chart and/or of the block diagram and a combination of each block of the flow chart and/or of the block diagram of the invention, may be implemented by computer program instructions. These computer program instructions may be provided to a general computer, a dedicated computer or a processor of other programmable data processing apparatus, thereby a machine is produced to cause these instructions executed by a computer or other programmable data processing apparatus to produce an apparatus realizing functions/operations provisioned in blocks of the flow chart and/or of the block diagram.

These computer program instructions may also be stored in a computer-readable medium capable of instructing the computer or other programmable data processing apparatus to work in a particular way, so that instructions stored in the computer-readable medium produce an article of manufacture including instruction means realizing functions/operations provisioned in blocks of the flow chart and/or of the block diagram.

The computer program instructions may also be loaded onto the computer or other programmable data processing apparatus, making the computer or other programmable data processing apparatus perform a series of operation steps to produce a computer-implemented process, and consequently, the instructions executed on the computer or other programmable apparatus provide the process realizing functions/operations provisioned in blocks of the flow chart and/or of the block diagram.

The flow chart and the block diagram in the drawings illustrate architecture, functions and operations of a system, method and computer program product which may be realized in accordance with various embodiments of the invention. At this point, each block of the flow chart or of the block diagram may represent a module, program segment, or part of code, containing one or more executable instructions for realizing the provisioned logic functions. It should also be noted that in some implementations as alternatives, functions marked in the blocks may occur in different order marked in the drawings. For example, two connecting blocks may in fact be executed basically parallel, and sometimes may be executed in the contrary order, depending on involved functions. It should be noted also that each block of the flow chart and/or of the block diagram and a combination of blocks of the flow chart and/or of the block diagram may be realized using a dedicated hardware-based system executing the provisioned functions or operations, or may be realized using a combination of dedicated hardware and computer instructions.

The invention claimed is:

1. A method for determining the position of a wireless communication device moving in a cellular wireless communication network, comprising:
    recording the moving path of the wireless communication device in cells of the cellular wireless communication network;
    recording the moving path and GPS information of a GPS wireless communication device moving in the cellular wireless communication network in cells of the cellular wireless communication network;
    determining the GPS wireless communication device whose moving path matches with the moving path of the wireless communication device;
    determining the position of the wireless communication device based on the GPS information of the matching GPS wireless communication device.

2. The method according to claim 1, wherein the determining the GPS wireless communication device whose moving path matches with the moving path of the wireless communication device comprising finding the GPS wireless communication device which passes through the same cells, whose residence time in the same cell is close and whose moment of leaving the last same cell is close in comparison with the wireless communication device.

3. The method according to claim 1, wherein
    the moving path of the wireless communication device in cells of the cellular wireless communication network is cell handover information obtained by the wireless communication device according to cell identification signaling broadcasted by a mobile base station, wherein the cell where the wireless communication device enters and entering time are contained; and,
    the moving path of the GPS wireless communication device in cells of the cellular wireless communication network is cell handover information obtained by the GPS wireless communication device according to the cell identification signaling broadcasted by the mobile base station, wherein the cell where the GPS wireless communication device enters and entering time are contained.

4. The method according to claim 3, wherein the finding the GPS wireless communication device which passes through the same cells, whose residence time in the same cell is close and whose moment of leaving the last same cell is close in comparison with the wireless communication device further comprising finding the GPS wireless communication device which passes through the same cells, whose residence time in the same cell is close and whose moment of leaving the last same cell is close in comparison with the wireless communication device according to the cell handover information of the wireless communication device and the GPS wireless communication device.

5. The method according to claim 4, wherein the finding the GPS wireless communication device which passes through the same cells, whose residence time in the same cell is close and whose moment of leaving the last same cell is close in comparison with the wireless communication device according to the cell handover information of the wireless communication device and the GPS wireless communication device further comprising deriving cell handover sequences of the wireless communication device and the GPS wireless communication device from the cell handover information of the wireless communication device and the GPS wireless communication device respectively, and determining the GPS wireless communication device whose cell handover sequence matches with the cell handover sequence of the wireless communication device, wherein the cell handover sequence contains residence time of the corresponding wireless communication device or GPS wireless communication device in cells and the moment of leaving the last cell.

6. The method according to claim 5, wherein the determining the GPS wireless communication device whose cell handover sequence matches with the cell handover sequence of the wireless communication device comprising determining the GPS wireless communication device whose cell handover sequence $S2=\{T2, (C1, t1'), (C2, t2'), \ldots (CK, tK')\}$, in comparison to the cell handover sequence $S1=\{T1, (C1, t1),$ $(C_2, t_2), \ldots (C_K, t_K)\}$ of the wireless communication device, satisfies the following condition of:

$$|T_1-T_2|<\text{Delta } T \text{ and } |t_i-t_i'|<\text{Delta } t, i=1, 2, \ldots, K$$

wherein, $t_i$ and $t_i'$ are residence times of the wireless communication device and the GPS wireless communication device in cell $C_i$ respectively, $T_1$ and $T_2$ are moments when the wireless communication device and the GPS wireless communication device leave the last cell $C_K$ respectively, and Delta T and Delta t are predetermined thresholds respectively.

7. The method according to claim 6, wherein the determining the position of the wireless communication device comprising obtaining the position of the GPS wireless communication device at the moment $T_2+t-T_1$ as the position of the wireless communication device at the current moment t according to the GPS information of the matching GPS wireless communication device.

8. The method according to claim 7, further comprising calculating a difference in speed between the wireless communication device and the matching GPS wireless communication device according to the cell handover sequence of the wireless communication device and the cell handover sequence of the matching GPS wireless communication device, and amending the position of the wireless communication device at the current moment t according to the difference in speed.

9. A system for determining the position of a wireless communication device moving in a cellular wireless communication network, comprising:
   recording means, for recording moving paths of the wireless communication device and a GPS wireless communication device in cells of the cellular wireless communication network;
   GPS information recorder, for recording GPS information of the GPS wireless communication device;
   comparator, for determining the GPS wireless communication device whose moving path matches with the moving path of the wireless communication device;
   position calculator, for determining the position of the wireless communication device based on the GPS information of the matching GPS wireless communication device.

10. The system according to claim 9, wherein the comparator comprising means for finding the GPS wireless communication device which passes through the same cells, whose residence time in the same cell is close and whose moment of leaving the last same cell is close in comparison with the wireless communication device.

11. The system according to claim 9, wherein:
   the moving path of the wireless communication device in cells of the cellular wireless communication network is cell handover information obtained by the wireless communication device according to cell identification signaling broadcasted by a mobile base station, wherein the cell where the wireless communication device enters and entering time are contained;
   the moving path of the GPS wireless communication device in cells of the cellular wireless communication network is cell handover information obtained by the GPS wireless communication device according to the cell identification signaling broadcasted by the mobile station, wherein the cell where the GPS wireless communication device enters and entering time are contained.

12. The system according to claim 11, wherein the means for finding the GPS wireless communication device which passes through the same cells, whose residence time in the same cell is close and whose moment of leaving the last same cell is close in comparison with the wireless communication device finds the GPS wireless communication device which passes through the same cells, whose residence time in the same cell is close and whose moment of leaving the last same cell is close in comparison with the wireless communication device according to the cell handover information of the wireless communication device and the GPS wireless communication device.

13. The system according to claim 12, wherein the means for finding the GPS wireless communication device which passes through the same cells, whose residence time in the same cell is close and whose moment of leaving the last same cell is close in comparison with the wireless communication device further comprising means for deriving cell handover sequences of the wireless communication device and the GPS wireless communication device from the cell handover information of the wireless communication device and the GPS wireless communication device respectively, and means for determining the GPS wireless communication device whose cell handover sequence matches with the cell handover sequence of the wireless communication device, wherein the cell handover sequence contains residence time of the corresponding wireless communication device or GPS wireless communication device in cells and the moment of leaving the last cell.

14. The system according to claim 13, wherein the determining the GPS wireless communication device whose cell handover sequence matches with the cell handover sequence of the wireless communication device comprising determining the GPS wireless communication device whose cell handover sequence $S_2=\{T_2, (C_1, t_1'), (C_2, t_2'), \ldots (C_K, t_K')\}$, in comparison to the cell handover sequence $S_1=\{T_1, (C_1, t_1), (C_2, t_2), \ldots (C_K, t_K)\}$ of the wireless communication device, satisfies the following condition of:

$$|T_1-T_2|<\text{Delta } T \text{ and } |t_i-t_i'|<\text{Delta } t, i=1, 2, \ldots, K$$

wherein, $t_i$ and $t_i'$ are residence times of the wireless communication device and the GPS wireless communication device in cell $C_i$ respectively, $T_1$ and $T_2$ are moments when the wireless communication device and the GPS wireless communication device leave the last cell $C_K$ respectively, and Delta T and Delta t are predetermined thresholds respectively.

15. The system according to claim 14, wherein the position calculator obtains the position of the GPS wireless communication device at the moment $T_2+t-T_1$ as the position of the wireless communication device at the current moment t according to the GPS information of the matching GPS wireless communication device.

16. The system according to claim 15, wherein the position calculator further comprising means for calculating difference in speed between the wireless communication device and the matching GPS wireless communication device according to the cell handover sequence of the wireless communication device and the cell handover sequence of the matching GPS wireless communication device, and amending the position of the wireless communication device at the current moment t according to the difference in speed.

* * * * *